United States Patent
Venkataramani et al.

(10) Patent No.: US 7,964,294 B2
(45) Date of Patent: Jun. 21, 2011

(54) LOW SURFACE ENERGY COATINGS FOR COOKING PRODUCTS

(75) Inventors: Venkat Subramaniam Venkataramani, Clifton Park, NY (US); Salil Mohan Joshi, Mumbai (IN); Nagaveni Karkada, Karnataka (IN); Sundeep Kumar, Karnataka (IN)

(73) Assignee: General Electric Company, Niskayuna, NY (US)

( * ) Notice: Subject to any disclaimer, the term of this patent is extended or adjusted under 35 U.S.C. 154(b) by 343 days.

(21) Appl. No.: 12/169,272

(22) Filed: Jul. 8, 2008

(65) Prior Publication Data

US 2010/0009177 A1    Jan. 14, 2010

(51) Int. Cl.
 *B32B 9/00* (2006.01)
(52) U.S. Cl. ........ 428/697; 428/689; 428/696; 428/698; 501/12; 501/14; 501/25; 501/57
(58) Field of Classification Search ................. 428/689, 428/696, 697, 698; 501/25, 14, 57, 12; 106/4.13, 106/14.14, 14.21, 14.23, 14.24, 14.42, 14.44, 106/15.05, 18.35, 814, 287.19, 287.23, 287.24, 287.27, 287.28

See application file for complete search history.

(56) References Cited

U.S. PATENT DOCUMENTS

| | | | |
|---|---|---|---|
| 3,580,733 A * | 5/1971 | Ott | ........................... 127/273 A |
| 4,180,482 A | 12/1979 | Nishino et al. | |
| 4,504,717 A | 3/1985 | Arai | |
| 5,382,552 A | 1/1995 | Saad et al. | |
| 6,429,161 B1 | 8/2002 | Souchard et al. | |
| 6,437,294 B2 | 8/2002 | Allera et al. | |
| 7,037,591 B2 | 5/2006 | Henze et al. | |
| 2008/0035896 A1 | 2/2008 | Striegler et al. | |

FOREIGN PATENT DOCUMENTS

| | | |
|---|---|---|
| GB | 1481401 | 7/1977 |
| WO | 9614353 | 5/1996 |

* cited by examiner

*Primary Examiner* — Gwendolyn Blackwell
(74) *Attorney, Agent, or Firm* — Richard D. Emery

(57) ABSTRACT

An easy to clean and stain resistant coating for a cooking product includes an oxycarbofluoride coating. The oxycarbofluoride coating has a composition comprising at least one metal oxide, carbon and fluorine and can be applied to a substrate using a sol-gel process.

16 Claims, No Drawings

LOW SURFACE ENERGY COATINGS FOR COOKING PRODUCTS

BACKGROUND

The present disclosure generally relates to low surface energy coatings, and more particularly, to oxycarbofluoride coatings for cooking products so as to enable easy clean up as well as prevent staining.

In certain food related applications, such as the interior walls of ovens, cooking top surfaces, pans, doors, enameled and wire grates, and the like, it is advantageous to have a coating that affords easy cleaning. The advantages of easy-to-clean coatings are that dirt and/or soil can be readily removed and therefore aggressive cleaning agents are not needed on these types of surfaces. The coating should not alter other surface properties such as surface appearance or roughness. The undoubtedly huge potential of easy-to-clean coatings, however, is not at all matched by the market penetration of such systems.

Various coating formulations, based on silicones or alkylpolysiloxanes in addition to glazes have been developed. However, many of the prior art coatings result in surface pitting and degradation during service, which diminishes cleanability. Surface degradation might also lead to opening of closed cell pores within the coating, thus leading to microscale holes, which are often hard to clean by conventional cleaning techniques. Moreover, some of the existing easy-to-clean formulations contain noxious and ecologically harmful solvents such as petroleum or even halogenated hydrocarbons, which are not acceptable in many applications. A further disadvantage of many commercial products is that the resulting coatings have a low abrasion resistance, and/or low thermal stability, and as such, do not provide long-term stability.

Accordingly, there is a desire for improved coatings that provide enhanced cleanability and stain resistance for surfaces used in food related applications.

BRIEF SUMMARY

Disclosed herein are heating devices and enamel compositions formed of an oxycarbofluoride composition. Also disclosed are processes for forming the oxycarbofluoride coating using a sol-gel process. The heating device comprises at least one surface comprising an oxycarbofluoride coating, wherein the oxycarbofluoride coating has a composition comprising at least one metal oxide, carbon, and fluorine.

The enamel composition comprises an oxycarbofluoride composition comprising at least one metal oxide, carbon, and fluorine.

The process for forming an oxycarbofluoride coating onto a substrate surface comprises applying a sol-gel solution to the substrate surface, wherein the sol-gel solution comprises at least one metal oxide precursor and a fluorine precursor in a solvent; hydrolyzing the sol-gel solution; drying the sol-gel solution to form a gel layer; and thermally curing the gel layer in the presence of carbon to form the oxycarbofluoride coating comprising at least one metal oxide, carbon, and fluorine.

The disclosure may be understood more readily by reference to the following detailed description of the various features of the disclosure and the examples included therein.

DETAILED DESCRIPTION

The present disclosure is generally directed to oxycarbofluoride coatings of the type MO—C—F, wherein MO is at least one metal oxide, C is carbon, and F is fluorine. Advantageously, when used in food related applications the oxycarbofluoride coatings provide the selected surfaces with a low surface energy that enables easy cleanability as well as minimizes staining from spills on these surfaces.

In one embodiment, the oxycarbofluoride coatings are applied to a substrate surface using a sol-gel process to the selected surfaces of cooking products, wherein the selected surfaces are food related applications prone to heat and spillage that can form burnt-in and/or baked-on stains. The sol-gel process is advantageous in that it is an economical, low temperature technique that allows for the fine control of the chemical composition, as even small quantities of dopant can be introduced in the sol. Typical substrates used in food related applications include, without limitation, steel, aluminized steel, cast iron, cast iron coated with enamel, zerodur glass in the case of cooktop applications, and the like. The precursor sol can be deposited directly onto the substrate surface to form a film such as by dip coating, spin-coating, spray coating, and the like. The film is further processed to form a thermally stable surface.

The general preparation of the sol-gel for preparing the oxycarbofluoride coating includes a reaction between inorganic metal salts or organometallic compounds such as metal alkoxides. The reaction initially proceeds by way of hydrolysis resulting in a colloidal suspension and subsequently a gel is formed upon further hydrolysis followed by condensation to form a rigid, stable network. Formation of the metal oxide network generally involves connecting the metal center with oxo (M-O-M) or hydroxo (M-OH-M) bridges, thereby generating metal-oxo or metal hydroxo polymers in solution. The presence of carbon and fluorine within the network results in a surface that is non-wettable to stains such as Cheese Whiz and strawberry jam. The drying process serves to remove the liquid phase from the gel thus forming a porous network. The substrate is then fired to cause additional polycondensation and further enhance the mechanical properties of the coating.

Suitable drying temperatures to affect hydrolysis are generally between 0° C. and 200° C. In other embodiments, the temperature is between 20° C. and 150° C., and in still other embodiments, between room temperature and 100° C. By appropriate selection of the hydrolysis conditions, it is possible to produce very dense, namely more or less pore-free gel networks or networks having only the tiniest pores.

Once the coating has been applied and the liquid removed, the coating is thermally cured (fired), i.e., by heating. In one embodiment, the coated substrates are fired at a temperature of 300° C. to 600° C., and in other embodiments from 300° C. to 550° C., and in still other embodiments, from 450° C. to 550° C. Depending on the polymer type, the curing atmosphere may occur in an atmosphere containing an inert gas (e.g., nitrogen, argon, helium), oxygen and/or air. To incorporate carbon, the atmosphere may include carbon monoxide, acetylene and the like. In one embodiment, the thickness of the coating after thermally curing the coating is less than 5 microns.

It has been discovered that roughness of the substrate influences cleanability. For example, it has been discovered that when alumina substrate with different roughness values was stained, the substrates with the roughest surface (Ra=1.6 microns) resulted in incomplete stain removal whereas the smooth surfaces (Ra~0.05 microns) resulted in complete stain removal. Advantageously, using the sol-gel process, the oxycarbofluoride coatings formed on a substrate typically have a surface roughness of about ~0.04 microns or less, which resulted in complete removal of stain.

As noted above, the metal oxide can be formed in the sol-gel process from inorganic metal salts or organometallic compounds such as metal alkoxides. The particular metal oxide is not intended to be limited and the selection of which will generally depend on the desired application. Suitable metal oxides for the oxycarbofluoride composition thus include, but are not limited to, titanium oxides, particularly titanium dioxide, tantalum oxides, tin oxides, niobium oxide, zinc stannate, zinc oxides, zirconium oxides, germanium oxide, aluminum oxide, indium oxide, cadmium oxide, cerium oxide, yttrium oxide, hafnium oxide, tungsten oxide, vanadium oxide, chromium oxide, molybdenum oxide, iridium oxide, nickel oxide, silicon oxide; and any mixtures or combinations thereof and also including metal oxynitrides and alloys thereof. Moreover, one or more metal oxides can be included. For example, the metal oxide can include a two component series of metal oxides such as $TiO_2$—$SiO_2$, $TiO_2$—$Al_2O_3$, $TiO_2$—$GeO_2$, $TiO_2$—$ZrO_2$, $CeO_2$—$SiO_2$, $CeO_2$—$Al_2O_3$, $CeO_2$—$GeO_2$, $CeO_2$—$ZrO_2$, or coating compositions including three or higher order component series. For example, the oxycarbofluoride composition can include oxides of aluminum, yttrium, and zirconium to provide coatings with increased hardness whereas compositions including titanium dioxide as one of the metal oxides may be included to increase the refractive index. Titanium dioxide also contributes to hardness, is chemically resistant, and exhibits high refractive index (n=2.7), therefore, compositions including titanium dioxide would have an increased refractive index relative to those coatings without titanium dioxide.

The fluorine component can be introduced into the sol-gel system using organic compounds such as perfluorobutane sulfonate (PFBS), fluorinated acetic acid, ammonium fluoride, and the like.

The carbon component can be introduced into the system by heating the sol in a carbon atmosphere. For example, the coated surfaces can be thermally cured (i.e., fired) in the presence of activated carbon, carbon monoxide, acetylene atmosphere to incorporated carbon into the system.

In one embodiment, the metal oxide is in the range from 10 to 70 mol %, carbon is in the range of 1 to 5 mol %, and fluorine is in the range of 1 to 25 mol %. By way of example, for a $TiO_2$—$SiO_2$—C—F oxycarbofluoride coating, the $TiO_2$ may be in the range of 10 to 50 mol %, $SiO_2$ may be in the range of 40 mol % to 70 mol %, carbon may be in the range of 1 to 5 mol %, and fluorine may be in the range of 1 mol % to 20 mol %.

The oxycarbofluoride coating can further include metal and/or ceramic fillers. Suitable ceramic fillers include, for example, carbides such as silicon carbide, hafnium carbide, boron carbide, and the like; oxynitrides such as silicon oxynitride; oxycarbohalides; carbonitrides; nitrides such as germanium nitride, boron nitride, nickel-chromium nitride, titanium nitrides, tantalum nitride, niobium nitride, silicon nitride, aluminum nitride, and zirconium nitride; and/or the like. The metal and/or ceramic fillers can be introduced through the sol-gel solution prior to applying to the substrate or during a thermal curing step of the coated substrate surface.

In the following examples, coatings were characterized using surface technologies such as scanning electron microscopy and inverted optical microscope. Mechanical properties were evaluated using a Revetest Scratch Adhesion tester. Surface roughness was determined by surface profilometry and contact angle measurements were carried out on the coatings to study the hydrophobic-oleophobic properties. The substrates were cooking grates and were exposed to a variety of food stains such as cheese whiz and strawberry jam.

The following examples are presented for illustrative purposes only, and are not intended to limit the scope of the invention.

The stain test included applying a processed cheese spread commercially available under the trade name Cheese Whiz and a strawberry jam at different locations on the substrate surface. The substrate was enameled grates and once the Cheese Whiz and strawberry jam were applied, was heated to 150° C. in 10 minutes and maintained at 150° C. for 1 hour; further heated to 250° C. in 10 min and maintained at 250 C for one hour, and then cooled to room temperature. The substrates were then cleaned after 24 hours using the following protocol: scrubbing with 1. dry paper towel; 2. wet paper towel; 3. paper towel and soap water; 4. sponge and soap water; and 5. an abrasive pad commercially available under the trade name Scotch Brite and soap water. The substrates were then visually examined and images captured after each step.

Example 1

In this example, an oxycarbofluoride coating of the type $TiO_2$—$SiO_2$—C—F was prepared using a sol-gel process. Ti-isopropoxide (Sigma-Aldrich), tetraethoxysilane (Sigma-Aldrich), and a fluoropolymer available under the trade name FC-4432 by 3M Novec Company were used as precursors in isopropanol, dip coated onto an enameled grate substrate, and dried at room temperature. The coated substrate was then fired with activated carbon (Sigma-Aldrich) to incorporate carbon into the composition. The coated substrate was then fired from room temperature to 550° C. at the heating rate of 2° C./min for a duration of 2 hours along with the activated carbon. The oxycarbofluoride composition was 38.5 mol % $TiO_2$, 53.5 mol % $SiO_2$, 5 mol % fluorine and 3 mol % carbon. Surface roughness of the final coating was found to be 0.04 micron.

Example 2

In this example, an oxyfluoride coating of the type $K_2O$—$Na_2O$—$Li_2O$—ZnO—$Al_2O_3$—$P_2O_5$—$SiO_2$—F was prepared using a sol-gel process. Initially, tetraethoxysilane (TEOS; Aldrich) was added to 0.1 M nitric acid and the mixture was allowed to react for 60 minutes (min) for the acid hydrolysis of TEOS. Then a series of reagents were added in the following sequence, allowing 45 min for each reagent to react completely: $H_3PO_4$, lithium/sodium/potassium carbonates (Aldrich), zinc nitrate hexahydrate (Aldrich) and fluoroacetic acid (Sigma-Aldrich). After the final addition, mixing was continued for 1 hour to allow the completion of hydrolysis. The resultant solution was kept at ambient temperature and continuously stirred. Just before gelation, grate coupons were dip coated and dried at room temperature. The dried coupons were heat treated for 2 hours at 500° C. to stabilize the glass and eliminate residual nitrates. The total alkali (e.g., Li, Na, and K) was in the range of 10 to 25 mol %, 5 mol % $\leq Al_2O_3 <$ 20 mol %; 2.5 mol % $\leq$ ZnO < 10 mol %; 2.5 mol % $\leq P_2O_5 <$ 10 mol %; 30 mol % $\leq SiO_2 <$ 79 mol %, and fluorine in the range of 1 mol % to 25 mol %. In this particular example, the composition of the coating was 50 mol % $SiO_2$, 15 mol % $Al_2O_3$, 10.67 mol % $K_2O$, 8 mol % $Na_2O$, 1.33 mol % $Li_2O$, 5 mol % ZnO, 5 mol % $P_2O_5$ and 5 mol % fluorine.

Example 3

In this example, the stain test was carried out on pristine enamel as a reference. The uncoated substrate was in the form of a cooking grate and was found to be vulnerable to both cheese whiz and strawberry jams. Cleaning with scotch brite and soap water had no significant cleaning effect on the surface. The grate surface (composition determined using EDAX, Energy Dispersive Analysis of X-rays) is mainly composed of $SiO_2$, $Na_2O$, $TiO_2$, and CaO in addition to limited amounts of $Al_2O_3$, $Cr_2O_3$, $K_2O$, and $Fe_2O_3$. The surface roughness number Ra for the substrate (grate) was 0.10 micron.

Example 4

In this example, the stain test was carried out on enamel including a top coat of $K_2O$—$Na_2O$—$Li_2O$—ZnO—$Al_2O_3$—$P_2O_5$—$SiO_2$—F as prepared in accordance with Example 2 and at a thickness of about 2 microns. The coating did not exhibit staining with Cheese Whiz, which was readily removed using paper and soap water. However, the coating was susceptible to strawberry jam staining. It has been discovered that the alkali metal phosphosilicate coating such as $K_2O$—$Na_2O$—$Li_2O$—ZnO—$Al_2O_3$—$P_2O_5$—$SiO_2$—F is readily degraded in solutions at various pHs. In acidic and neutral environments, a hydrated surface is known to form as a result of ion exchange reaction between the alkali metal ions in the glass and the hydrogen ions in solution whereas in basic environments, the whole glass structure is attacked. The strawberry jam was acidic and contact with the grate having the alkali metal based glass coating resulted in degradation.

Example 5

In this example, the stain test was carried out on an enamel grate including a top coat of $TiO_2$—$SiO_2$—C—F as prepared in accordance with Example 1 and at a thickness of about 2 microns. Both cheese whiz and strawberry jam were completely removed by scrubbing with the abrasive pad and soap water.

Advantageously, because of its excellent abrasion-resistance and food contact resistance, the coating is particularly suitable for application to the interior surfaces of oven cavities, cooking tops, range tops, burner grates, and the like.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A device comprising:
   at least one surface comprising an oxycarbofluoride coating, wherein the oxycarbofluoride coating has a composition comprising at least one metal oxide, carbon, and fluorine,
   wherein the at least one metal oxide is in a range of 10 to 70 mol %, the carbon is in a range of 1 to 5 mol %, and the fluorine is in a range of 1 mol % to 25 mol %.

2. The device of claim 1, wherein the oxycarbofluoride coating comprises $TiO_2$—$SiO_2$—C—F.

3. The device of claim 2, wherein the $TiO_2$ is in a range of 10 to 50 mol %, the $SiO_2$ is in a range of 40 mol % to 70 mol %, the carbon is in a range of 1 to 5 mol %, and the fluorine is in a range of 1 mol % to 25 mol %.

4. The device of claim 1, wherein the at least one surface comprising the oxycarbofluoride coating has a surface roughness (Ra) less than 0.04 microns.

5. The device of claim 1, wherein the oxycarbofluoride coating is at a thickness of less than 5 microns.

6. The device of claim 1, wherein the composition further comprises carbides, oxynitrides, oxycarbohalides, carbonitrides, and/or nitrides.

7. A composition comprising:
   an oxycarbofluoride composition comprising at least one metal oxide, carbon, and fluorine,
   wherein the at least one metal oxide is in a range of 10 to 70 mol %, the carbon is in a range of 1 to 5 mol %, and the fluorine is in a range of 1 mol % to 25 mol %.

8. The composition of claim 7, wherein the composition further comprises carbides, oxynitrides, oxycarbohalides, carbonitrides, and/or nitrides.

9. The composition of claim 7, wherein the oxycarbofluoride coating comprises $TiO_2$—$SiO_2$—C—F.

10. The composition of claim 9, wherein the $TiO_2$ is in a range of 10 to 50 mol %, the $SiO_2$ is in a range of 40 mol % to 70 mol %, the carbon is in a range of 1 to 5 mol %, and the fluorine is in a range of 1 mol % to 25 mol %.

11. A device comprising:
    at least one surface comprising an oxycarbofluoride coating, wherein the oxycarbofluoride coating has a composition comprising at least one metal oxide, carbon, and fluorine,
    wherein the composition further comprises carbides, oxynitrides, oxycarbohalides, carbonitrides, and/or nitrides.

12. The device of claim 11, wherein the at least one metal oxide is in a range of 10 to 70 mol %, the carbon is in a range of 1 to 5 mol %, and the fluorine is in a range of 1 mol % to 25 mol %.

13. The device of claim 11, wherein the oxycarbofluoride coating comprises $TiO_2$—$SiO_2$—C—F.

14. The device of claim 13, wherein the $TiO_2$ is in a range of 10 to 50 mol %, the $SiO_2$ is in a range of 40 mol % to 70 mol %, the carbon is in a range of 1 to 5 mol %, and the fluorine is in a range of 1 mol % to 25 mol %.

15. The device of claim 11, wherein the at least one surface comprising the oxycarbofluoride coating has a surface roughness (Ra) less than 0.04 microns.

16. The device of claim 11, wherein the oxycarbofluoride coating is at a thickness of less than 5 microns.

* * * * *